United States Patent [19]

Grosso

[11] 4,331,127
[45] May 25, 1982

[54] DOUBLE BOILER AND STEAM COOKER

[76] Inventor: Harry Grosso, 18 E. Main St., Somerville, N.J. 08876

[21] Appl. No.: 136,817

[22] Filed: Apr. 3, 1980

[51] Int. Cl.³ .......................... A47J 27/21; B65D 8/06
[52] U.S. Cl. ..................................... 126/377; 126/389
[58] Field of Search ............... 220/206, 208, 427, 428, 220/366, 360, 215, 453, 408; 126/389, 377

[56] References Cited

U.S. PATENT DOCUMENTS

| | | | |
|---|---|---|---|
| 191,986 | 6/1877 | Martin | 220/428 X |
| 199,962 | 2/1878 | Curtis et al. | 126/377 |
| 481,982 | 9/1892 | Taylor | 126/377 |
| 1,318,790 | 10/1919 | Murray | 220/428 X |
| 1,334,930 | 3/1920 | Chadwick | 126/377 |
| 1,640,190 | 8/1927 | Heinson | 126/377 |
| 1,640,191 | 8/1927 | Heinson | 126/377 |
| 2,076,437 | 4/1937 | Woods | 126/376 |
| 2,582,801 | 1/1952 | Steen | 220/428 X |
| 3,057,603 | 10/1962 | Isreeli | 220/428 X |

Primary Examiner—Allan N. Shoap

[57] ABSTRACT

A boiler and steam cooker consists of an outer vessel provided with an insulated side wall. The outer vessel has an upper inwardly directed flange supporting thereon the outwardly directed flange of an inner vessel. Interlocking structure is provided on the flanges for locking the vessels together which can be controlled by a cover co-operating with the interlocking structure. The cover can be manipulated by a pair of handles on the cover. The cover is also provided with a venting opening for venting of the inner vessel. Venting openings and access holes are also provided on the flange of the outer vessel for communication with a water space between the side and bottom walls of the inner and outer vessels.

2 Claims, 5 Drawing Figures

U.S. Patent  May 25, 1982  4,331,127
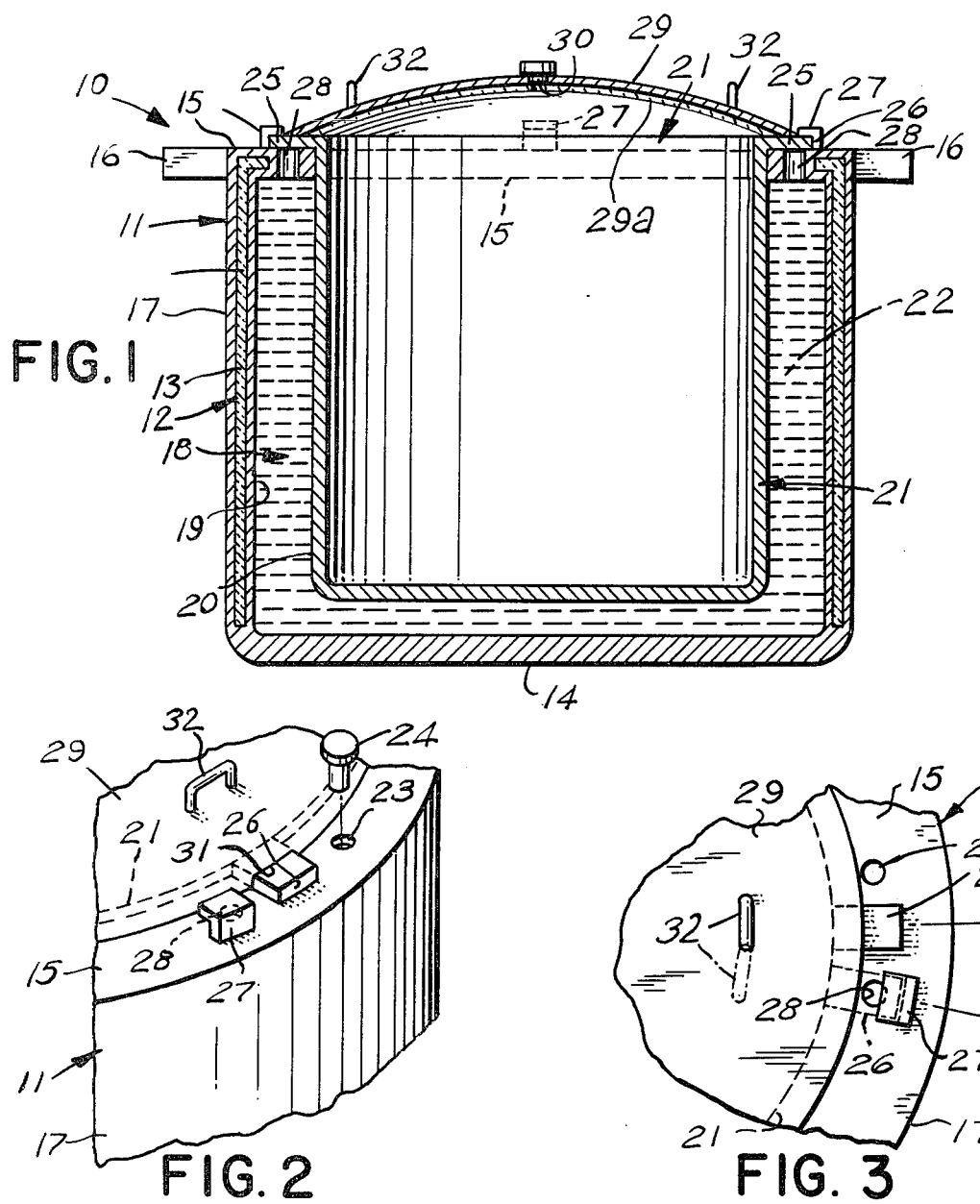
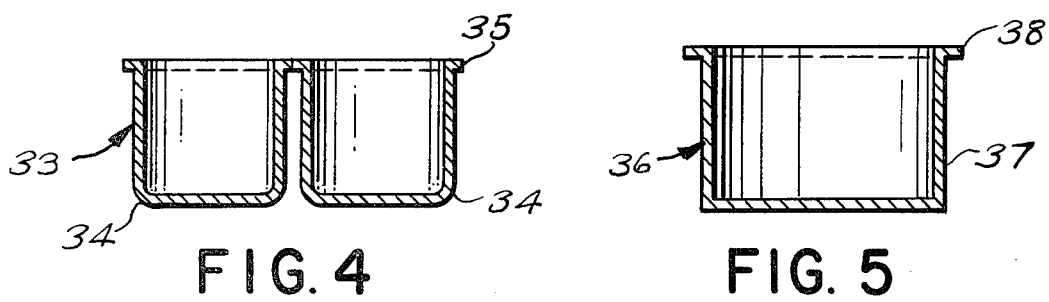

DOUBLE BOILER AND STEAM COOKER

This invention relates to kitchen utensils, and more particularly, to a double boiler and steam cooker.

It is, therefore, the principal object of this invention to provide a double boiler and steam cooker, which will enable the user to steam cook and boil food more efficiently, than in those constructed in the prior art manner.

Another object of this invention is to provide a double boiler and steam cooker, which will include insulation means, encased in the side wall of an outer vessel, so as to substantially reduce heat loss when the cooker is in use.

A further object of this invention is to provide a double boiler and steam cooker, which will receive water in compartment means, between the outer vessel and the inner vessel, which is removably received within the outer vessel, the water being, also, the heat-exchange means for the heat source and the food placed within the inner vessel.

A still further object of this invention is to provide a double boiler and steam cooker, which will include a top cover with handle means, for rotating it to lock the two vessels together.

Other objects of the present invention are to provide a double boiler and steam cooker, which is simple in design, inexpensive to manufacture, rugged in construction, easy to use and efficient in operation.

These and other objects will be readily evident upon a study of the following specification and the accompanying drawing wherein:

FIG. 1 is a vertical and cross-sectional view of the present invention, shown in elevation;

FIG. 2 is a fragmentary perspective view of FIG. 1, showing the vessel locking means;

FIG. 3 is a top plan view of FIG. 2, showing the cover rotated to locking position;

FIG. 4 is a side cross-sectional view of a modified form of inner vessel for FIG. 1, and is shown in elevation, and FIG. 5 is similar to FIG. 4, but illustrates another modified form of inner vessel for the invention.

According to this invention, a cooker 10 is shown to include an outer vessel 11, having a compartment 12, which is filled with, and retains a suitable insulation 13. Insulation 13 extends from just above the bottom wall 14 of vessel 11, into the inner flange 15 at the top of vessel 11, so as to retain more effectively the heat produced by the heat source, and a pair of oppositely opposed handles 16, of suitable heat resisting material, are fixedly secured by fasteners (not shown), to the outer periphery 17 of outer vessel 11, so as to enable the user to lift cooker 10 easily. A chamber 18 is defined by the inner periphery 19 of outer vessel 11, and the outer periphery 20 of inner vessel 21, so as to hold water 22, which is entered into openings 23 in flange 15, to fill cooker 10 to the level desired, and an inlet plug 24 is inserted into each opening 23. An annular flange 25, integral with the top of inner vessel 21, and extending outwards thereof, is supported upon the integral flange 15 of outer vessel 11, and a pair of oppositely opposed projections 26, which are integral with flange 25, are received removably under "L"-shaped members 27, which are fixedly secured to the top of flange 15 of vessel 11, for locking purposes. Projections 26, when under members 27, will close off the steam outlet openings 28, for using cooker 10 as a double boiler. When cooker 10 is used for steam cooking, the steam outlet openings 28 are uncovered in a manner which hereinafter will be described.

Cooker 10 is provided with a dome-shaped cover 29, and the outer rim rests upon the flange 25 of inner vessel 21. Cover 29 includes an opening 30, for the escape of excess steam pressure, when cooker 10 is used as a steam cooker. Cut-out openings 31, in the rim of cover 29, removably receive projections 26 of inner vessel 21, and a pair of spaced-apart handles 32, fixedly secured to cover 29, enables the user to rotate both the cover 29 and the inner vessel 21, simultaneously, to cover and uncover openings 28, and lock or unlock the flanges 25 and 15 of vessels 11 and 21 together.

As seen in FIG. 4, a modified inner vessel 33, includes a pair of spaced-apart food-receiving components 34, which have integral flange means 35, for seating upon the flange 15 of outer vessel 11 of cooker 10, and another modified form of inner vessel 36, shown in FIG. 5, includes a single food receiving component 37, having an integral flange 38 for seating upon flange 15 of vessel 11, heretofore described.

It shall be noted, that cooker 10 may be employed also, as a dutch oven, and it may be used as a portable steam table, for family convenience.

It shall further be noted, that cooker 10 is easily adaptable for outdoor use.

It shall also be recognized, that cover 29 includes a hard insulation material 29a, which is suitably bonded to its underside, for providing an additional means of retaining heat within cooker 10.

While various changes may be made in the detail construction, it is understood that such changes will be within the spirit and scope of the present invention, as is defined by the appended claims.

What I now claim is:

1. A double steam boiler cooker, comprising, in combination, an outer vessel, and an inner vessel removably placed inside said outer vessel, and a removable cover upon said inner vessel; a chamber being formed between an inner side of said outer vessel and an outer side of said inner vessel for holding water; said outer vessel comprising a bottom wall, a side wall and an inward flange at an upper edge of said side wall, said side wall and said flange containing a compartment therein, filled with insulation; said inner vessel comprising a bottom wall, a side wall and an outward flange at an upper edge of said side wall; said flange of said inner vessel resting upon said flange of said outer vessel; securement means between said vessels comprising a pair of outwardly projections on diametrically opposite sides of said inner vessel flange fitting under a pair of inwardly projecting, "L"-shaped members on diametrically opposite sides of said outer vessel flange; a plurality of openings through said outer vessel flange for access of water into said chamber, a removable plug closing each opening.

2. The combination according to claim 1, wherein a steam escape opening is included in said flange of said outer vessel beneath each of said pair of "L" shaped members, and said projections cover the steam escape openings when said inner vessel is rotated by said cover, said cover having handles on the top surface thereof for manual rotation of said cover, and said cover is insulated and includes an opening for the escape of excessive steam pressure when said cooker is used for steam cooking.

* * * * *